US010173239B2

(12) United States Patent
Jurcevic

(10) Patent No.: US 10,173,239 B2
(45) Date of Patent: Jan. 8, 2019

(54) SET FOR PROCESSING A LIGHT-CURING MATERIAL

(71) Applicant: KDS Holding GmbH, Wesseling (DE)

(72) Inventor: Dinko Jurcevic, Köln (DE)

(73) Assignee: KDS HOLDING GMBH, Wesseling (DE)

( * ) Notice: Subject to any disclaimer, the term of this patent is extended or adjusted under 35 U.S.C. 154(b) by 0 days.

(21) Appl. No.: 15/494,447

(22) Filed: Apr. 22, 2017

(65) Prior Publication Data

US 2017/0225193 A1 Aug. 10, 2017

Related U.S. Application Data

(63) Continuation-in-part of application No. 14/401,846, filed as application No. PCT/DE2013/100103 on Mar. 14, 2013, now Pat. No. 9,707,590.

(30) Foreign Application Priority Data

Mar. 15, 2012 (DE) .................... 20 2012 100 929 U

(51) Int. Cl.
B05C 17/10 (2006.01)
B29C 35/08 (2006.01)
B05C 17/005 (2006.01)
B05C 9/12 (2006.01)

(52) U.S. Cl.
CPC ............ B05C 17/10 (2013.01); B05C 9/12 (2013.01); B05C 17/0052 (2013.01); B29C 35/0805 (2013.01)

(58) Field of Classification Search
CPC combination set(s) only.
See application file for complete search history.

(56) References Cited

U.S. PATENT DOCUMENTS

| 4,722,326 A | * | 2/1988 | Ruderian | A61M 37/0092 |
| | | | | 401/2 |
| 8,591,133 B2 | | 11/2013 | Ho | |
| 2003/0000403 A1 | | 1/2003 | Vrotacoe et al. | |
| 2007/0098483 A1 | * | 5/2007 | Milesi | A45D 34/041 |
| | | | | 401/209 |

FOREIGN PATENT DOCUMENTS

| DE | 2157854 A1 | 5/1973 |
| EP | 0790119 A2 | 8/1997 |

OTHER PUBLICATIONS

Office Action dated Sep. 14, 2016, for U.S. Appl. No. 14/401,846.

* cited by examiner

Primary Examiner — David Walczak
(74) Attorney, Agent, or Firm — Norman B. Thot

(57) ABSTRACT

A set for dispensing and processing a light-curing material contained in a reservoir of an applicator includes a light source for curing the material dispensed from an outlet opening of the reservoir by the effect of pressure on the reservoir. The set further includes a modeling device having at least one of a smoothing surface and a working edge for processing the dispensed light-curing material. The light source can be fastened detachably or undetachably to the applicator or to the modeling device.

12 Claims, 6 Drawing Sheets

SET FOR PROCESSING A LIGHT-CURING MATERIAL

CROSS-REFERENCE TO RELATED APPLICATIONS

This application is a continuation-in-part of U.S. patent application Ser. No. 14/401,846, filed on Nov. 18, 2014, which application has since issued as U.S. Pat. No. 9,707,590, which in turn is the United States national stage of International Patent Application No. PCT/DE2013/100103, filed on Mar. 14, 2013, and which claims the benefit thereof. The International Patent Application claims the benefit under 35 USC § 119 of German Patent Application No. DE 20 2012 100 929.3 filed on Mar. 15, 2012. All applications are incorporated by reference herein in their entirety.

BACKGROUND OF THE INVENTION

This invention relates to a set for processing a light-curing material.

Materials of different viscosities are metered out in a familiar way for various purposes via an applicator or dispenser. The materials can be liquid or viscous. The applicator/dispenser can be manually operated depending on the application and intended use.

A dispenser designed in the form of a pen for applying a liquid rust converter that has an output part for the liquid and a cap that can be put in a removable way on the output part is known from the document DE 87 09 115 U1. The cap is provided with an abrasive surface that can be used to remove loose paint and rust from a surface that the rust converter is supposed to be applied to. The output part has elastic walls made of a polymer material that surround an elongated container for holding a stock of the rust converter, as well as an output tip made of a polymer material that has a housing mounted on the storage container with a through-hole that is connected to an opening leading into the storage container. The circumference of a valve element in the housing can make tight contact with an inner surface that forms an end part of the through-hole; a tip runs through the outlet end of the through-hole when the valve element makes tight contact with this inner surface. A pre-loading unit presses the valve element into the tight seat on the inner surface forming the end part of the through-hole and permits movement of the valve element into an open position in which it is at a distance from the inner surface so that rust converter can flow past it. The valve element can be put into its open position by pressing its tip onto a surface from which rust is to be removed, and the flow of the rust converter past the open valve element can be strengthened by pressing inwards on the elastic walls forming the storage container. If a desired amount of liquid has been applied, the dispenser is lifted off the surface, causing the valve element to tightly seal off the liquid in the container again. The cap cannot be put onto the output part again in such a way that a hollow area in it takes in a protects the tip arrangement.

This solution is not suitable for an application of light-curing material, because the light-curing material is usually used to combine components and it is therefore not desirable in many cases for a certain amount of pressure to be applied to the components to dispense it, as is the case in the above-mentioned solution. Furthermore, no LED exists because it is also not necessary.

A dispenser that is suitable for meting out flowing liquid glue, either in the form of a film or in the form of a series of small points or lines, wherein the dispenser has a container body that can be pressed together and has an outlet in the form of an elongated, cylindrical nozzle, is described in DE 89 09 092.6. The dispenser has a control cap with a coaxial tube that runs internally from the bottom of the flat, upper surface of the control cap, and the hole seats the nozzle. Moreover, the nozzle is provided with a positioning pin that works together with a screw groove in the inner surface of the tube to the effect that a rotation of the control cap by hand in a direction around the longitudinal axis of the nozzle causes the pin to travel along the groove in a direction against the end of the groove that is at a distance from the flat, upper surface of the control cap. This causes the nozzle to be pulled back into the dispenser until the tip of the nozzle is no longer projecting out of the flat, upper surface; rotation in the opposite direction causes the pin to run along the groove in a direction against the end of the groove that is closer to the flat, upper surface.

This causes the tip of the nozzle to project out of the flat, upper surface of the control cap. The base of the nozzle is attached to the walls of the container body via a flexible membrane in order to make movement of the nozzle of that type possible. When the nozzle is in the retracted position in which its tip is not projecting out of the flat, upper surface of the control cap, this surface acts as a spreading or distributing tool so that the glue coming out of the nozzle can be spread out into a film. When, in contrast, the nozzle is in its forward position in which it is projecting out of the flat, upper surface of the control cap, glue form the nozzle tip can be dispensed in the form of a fine line or in the form of a series of points. The design structure of this dispenser is relatively complex. Furthermore, it is a drawback that a removable closing cap is required to close up the dispenser. An LED is also unnecessary in this solution, because customary glue is dispensed here and not light-curing material.

A set that has at least one metering device with light-curing material that is seated in a removable way in a housing is known from a document DE 20 2011 109 785 U1, which is not a prior publication. Moreover, a light-emitting device for curing the light-curing material is arranged on the housing in the form of an LED lamp. A metering unit for dispensing the light-curing material is removably connected to the metering device; the metering unit and/or a metering channel of the metering unit has a removable closure for dispensing the light-curing material that is designed in the form of a cap and that has to be removed to dispense the light-curing material. The metering channel and the light-emitting device are formed or provided on two opposite end areas of the set; the housing has at least one opening for hand-controlled dosing of the light-curing material and a device for removable seating of the light-emitting device. The quantity of dispensed material is determined by the opening size of the metering channel in the process in combination with the pressure that is exerted on the metering device through the openings in the housing.

A drawback here is that the reservoir in the form of the metering device is additionally encased in a housing. The fact that the LED is arranged on the end of the housing opposite the metering channel likewise brings about an unfavorable effect on the handling process, because this makes it necessary to turn the set around after the light-curing material is dispensed and to only start the curing process at the point by actuating the LED. The light-curing material could run in an undesirable way before it is cured because of that.

The light-curing materials of different viscosities are processed for various purposes via a curing device (usually in the form of an LED). The materials can be liquid, viscous, pasty etc. A problem here is that the risk exists during the creation of joints or modeling areas extending a long way that the material will run after being dispensed or the material will not be able to be smoothed or modeled into the required form in a simple way before it is cured with the light-curing LED.

DETAILED DESCRIPTION

The object of this invention is to develop a set for processing a light-curing material that has a simple design structure and that permits the light-curing material to be dispensed from an applicator and shaped in a specific way if necessary.

The problem as per the invention is solved by a set with the features of the 1st claim.

Advantageous design forms follow from the sub-claims.

The set for processing a light-curing material, i.e. especially for the hand-controlled dosing of a light-curing material contained in a reservoir of an applicator, for curing the material and, if necessary, for shaping the material has at least one light source for curing the material dispensed from an outlet opening of the applicator via a pressure effect on the reservoir and, if necessary, a modeling device for processing the dispensed light-curing material; at least one light source is fastened to the applicator in a removable or non-removable way and/or at least one light source is fastened to the modeling device in a removable or non-removable way or at least one light source can be exchanged between the applicator and the modeling device.

Because of this diversity of variants, a set can be made available that is appropriate for a broad range of users because the light sources serving to cure the material can be arranged on both the modeling device and on the applicator. It is therefore possible to apply material with the applicator that is subsequently smoothed or shaped and cured by the modeling device or even to directly harden the material with the applicator.

The light source is preferably designed in the form of an LED lamp and arranged on the applicator and/or the modeling device in such a way that the LED lamp, when actuated, provides illumination in the direction of the outlet opening of the applicator for the light-curing material or in the direction of the dispensed material, i.e. when arranged on the modeling device, in the direction of its working edge/smoothing surface.

The light source can be attached to the reservoir of the applicator in a removable or non-removable fashion.

In so doing, it is also possible to arrange the modeling device on the applicator. This is preferably done in such a way that a working edge serving to model and/or smooth the dispensed material points in the direction of the outlet opening.

If the LED is also on this combination of an applicator and a modeling device and if the LED is pointing in the direction of the dispensed material, the following can be done in one working motion:
the material can be dispensed,
modeled or smoothed and
cured.

The LED lamp is preferably arranged in an LED housing (in particular with the accompanying wiring/electronics/switch/battery), and the LED housing can be connected with the applicator and/or the modeling device directly or via at least one adapter element.

The adapter element can, as an example, be designed in the form of a clip element or a plug-in element, or the LED housing can be screwed together with the applicator or the modeling device directly or via the adapter element. The LED housing is preferably arranged or formed on a ring-shaped or clamp-like adapter element; the ring-shaped adapter element can be fastened to the applicator and/or the modeling device. The adapter element can be part of the LED housing.

Furthermore, it is possible for at least one LED lamp with its LED housing to be designed as one piece along the circumference with the applicator and/or the modeling device in each case or for it to be molded along the circumference to the applicator and/or the modeling device.

The reservoir is formed in a pin-type applicator, in particular, and its shape can be changed in at least some areas. The light-curing material is available in the reservoir. The reservoir has at least a first opening; the applicator is provided with a dispensing unit with an outlet opening for the light-curing material, and the dispensing unit is connected to the reservoir in such a way that the light-curing material can be output into the dispensing unit through the first opening of the reservoir.

Moreover, the reservoir can be filled or refilled through at least one opening. The dispensing unit can be removable from the reservoir for this so that the first opening of the reservoir lying towards the dispensing unit serves to fill/refill the reservoir when the dispensing unit is removed. A refill opening can also be provided at other positions of the reservoir. A second opening that can be closed via a closure element can be added for this to the end of the reservoir opposite the first opening, for instance.

This closure element can be formed by the adapter element, for example, if the LED or the LED housing is attached to the end of the reservoir opposite the outlet opening.

The modeling device has a grip element with which it is held and moved along the dispensed material. The grip element is designed to be hollow in a preferred variant. Curable material can be available in the hollow area of the grip element that serves if necessary to fill or fill up the reservoir of the application through its first opening and/or second opening.

The modeling device can have a flat, smooth surface, but it can also contain recesses that can represent an arbitrary pattern. The smooth surface puts the dispensed material/the plastic into a mold. The plastic is subsequently cured by the LED in this mold.

The modeling and curing device has at least one grip element, a modeling device that is preferably exchangeable and an LED housing to hold batteries and LEDs or lasers that cure the plastic via radiation in a specific wavelength range.

BRIEF DESCRIPTION OF THE DRAWINGS

The instant invention is explained in more detail below with the aid of drawings. The following are shown in the figures.

DETAILED DESCRIPTION OF THE PREFERRED EMBODIMENTS

Figure 1:
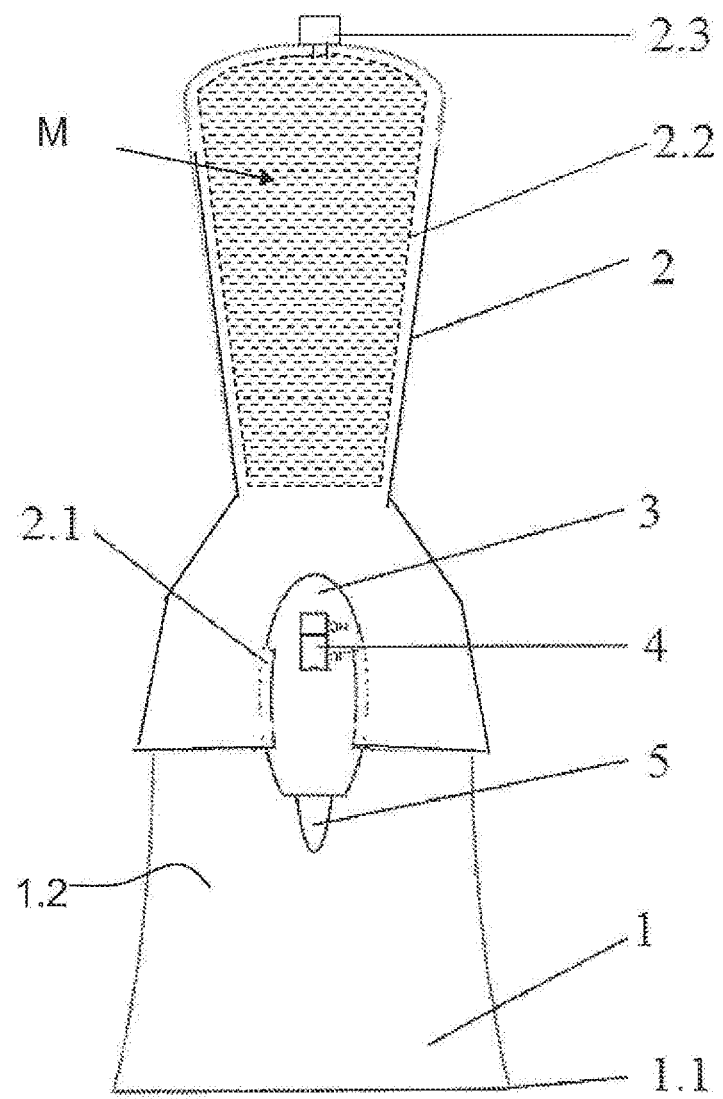
FIG. 1 shows a modeling device 1 with a grip element and an LED according to an exemplary embodiment in a front view.
Figure 2:
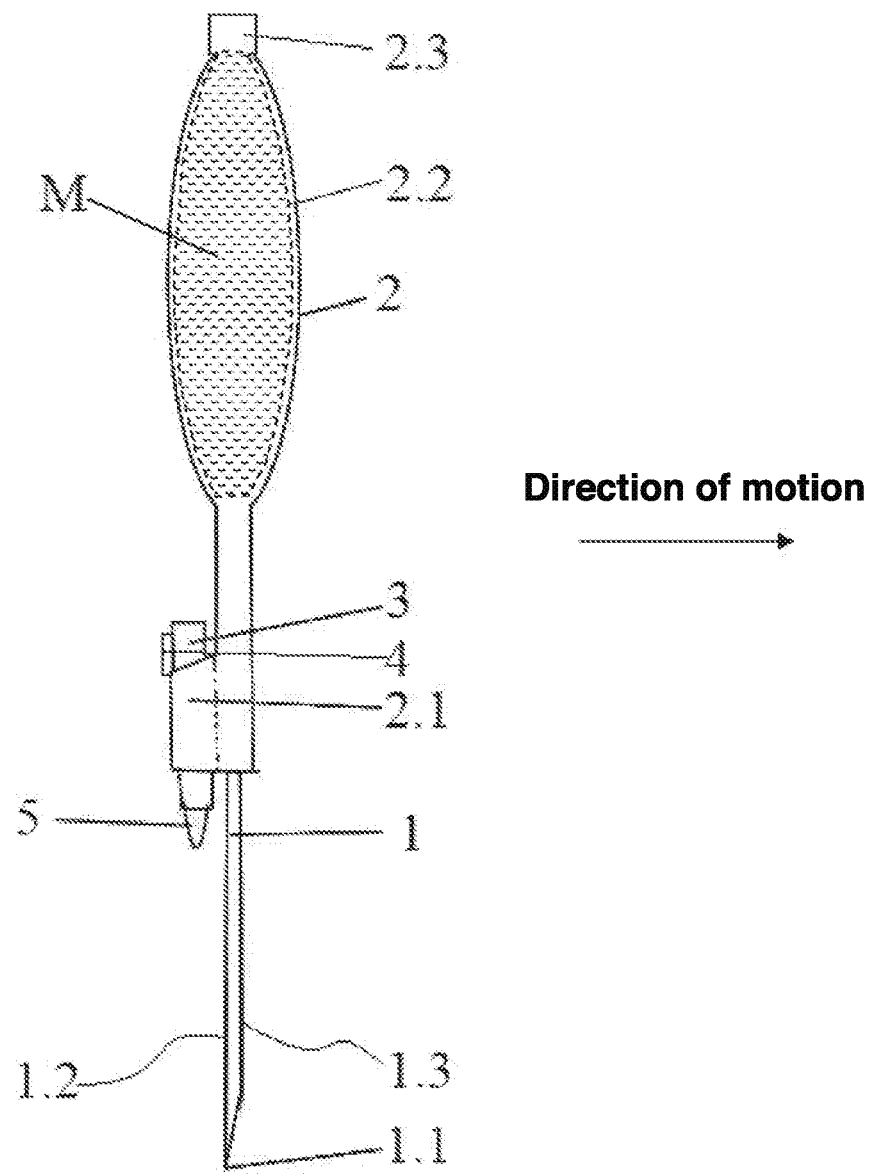
FIG. 2 shows a modeling device according to an exemplary embodiment in accordance with FIG. 1 as a side view.
Figure 3A:
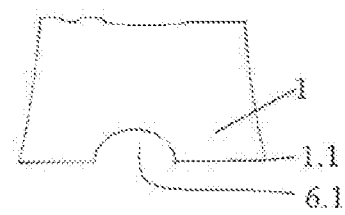
FIGS. 3A-3D show four variants of the structure of the smooth surface of the modeling device.
Figure 3B:
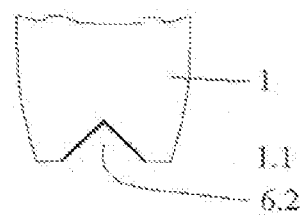
Figure 3C:
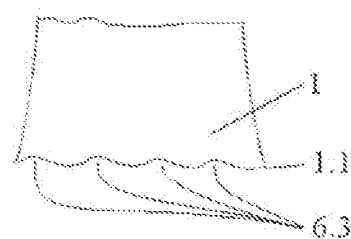
Figure 3D:
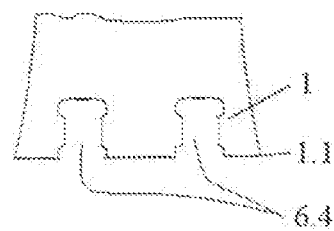

A modeling device 1 according to an exemplary embodiment is shown in FIGS. 1 and 2 that is combined with a grip element 2, an LED housing 3, an on-off switch 4 and LED 5 and that has a working edge or smooth surface 1.1.

The grip element 2 has a holder 2.1 for the housing 3 that is seated in either a removable or non-removable fashion in the holder 2.1. The LED is arranged in the direction of the back side 1.2 of the modeling device 1. A laser can also be arranged in the LED housing instead of an LED. The grip element 2 holds the modeling device 1 and tapers towards it. The modeling device 1 can be made of a metal or plastic and preferably has a plate-like shape.

The grip element 2 can likewise be made of a metal or plastic. The material for the modeling device 1 is selected in such a way that it is non-transparent—preferably at least or especially in a wavelength range of 300 to 600 nanometers (nm)—in order to protect the light-curing material that was dispensed from an applicator not shown here against undesired curing via the effect of light on the front side 1.3 of the modeling device 1 (side that the LED 5 is turned away from, see FIG. 2).

Now if the light-curing plastic/glue (not shown) is put on a surface by means of the applicator 7, the smooth surface 1.1 moves over it. In the process, the light-curing plastic is cured when the smooth surface 1.1 passes over via light of a wavelength suitable for the light-curing plastic.

In a variant shown here in FIGS. 1 and 2, the grip element 2 has a hollow area 2.2 that can be opened and closed via a closure 2.3 that is opposite the modeling device 1. Light-curing material M that can be filled into the reservoir of an applicator that is not shown here is located in the hollow area.

FIG. 2 shows the modeling and curing device according to an exemplary embodiment in a side view. It can be seen there that the LED 5 is arranged along with the accompanying LED housing 3 on the back side 1.2 that is opposite the direction of motion (direction of the arrow).

This ensures that the plastic is only cured when the smooth surface 1.1 is moved over it.

The smooth surface 1.1 of the smoothing device 1 can have various shapes to create different patterns in the light-curing material.

The LED housing 3 or a laser has, in addition to the LED lamp 5 or the laser, a battery (not shown), a lamp housing (not shown) and a switch 4 (preferably a pressure switch) for manual activation of the LED lamp, as well as other mechanical and electronic elements. Moreover, an activatable component to switch on continuous operation of the LED lamp can be contained in the LED housing 3.

The LED housing 3 with the LED lamp 5 is an independent component that can be inserted into the holder 2.1 for the housing 3 (in a removable or non-removable fashion). This has the advantage that all of the components required for the work step of processing the light-curing material are jointly available in a compact set, and they can easily be transported, for instance.

The LED housing 3 is preferably connected in a removable way, e.g. by insertion, to the holder 2.1 via a snap-in device with two spring elements. The LED housing 3 can be removed by simply pulling it out of this snap-in device.

It is also possible, in accordance with variants that are not shown, to design the smoothing device 1 and the holder 2.1 with the grip element 2 to be a single piece.

Four variants a to d of the structure of the smooth surface 1.1 of the modeling device 1 are shown in FIG. 3.

In Variant a, the smooth surface 1.1 has a semi-circular recess 6.1, so a contour with a corresponding semi-circular bulge made of plastic (not shown) is formed that extends lengthwise and that is cured by the LED when the modeling device 1 is pulled along.

According to Variant b, the recess 6.2 in the smooth surface 1.1 has a triangular shape. Triangular contours can be created from the plastic applied to the base along the direction of motion and cured via the LED because of that.

A waveshape is created in the plastic and cured via the LED with a waveform 6.3 in the smooth surface 1.1 in accordance with Depiction c via several essentially semi-circular recesses in the smooth surface.

Alternatively, a sawtooth-type shape could also be provided in the smooth surface (not shown).

Variant d shows a version in which two recesses 6.4 with the cross-section of a rail are arranged next to one another. In that case, two lines made of plastic corresponding to a rail are created at a distance from one another.

Two parallel "beads" in the form of a rail are created via the recesses 6.4 in the smooth surface 1.1 by moving over this with the smoothing device 1. This is an interesting variant for creating a rail for model railroads, especially for model construction.

Figure 4:
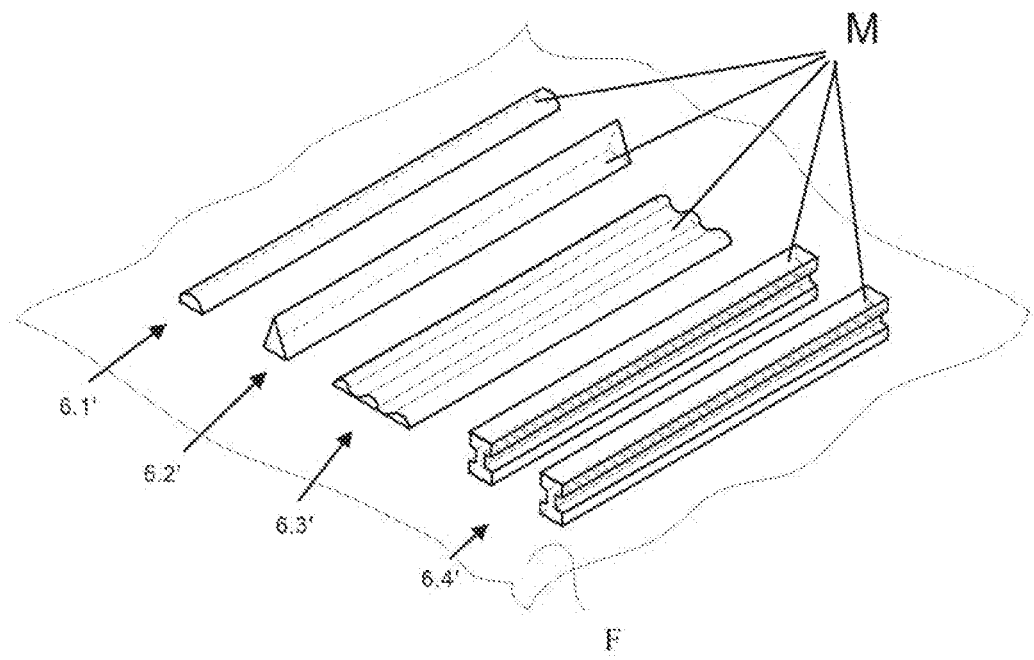
FIG. 4 shows four variants of the material M that is modeled with a modeling device and cured.

FIG. 4 shows a schematic diagram of the shapes that can be created on a surface F in the material M with the modeling device and stabilized via curing. They are, for example, a bead 6.1' with a semi-circular cross-section via a modeling device in accordance with FIG. 3, Depiction a; a bead 6.2' with a triangular cross-section via a modeling device in accordance with FIG. 3, Depiction b; a waveform 6.3' via a modeling device in accordance with FIG. 3, Depiction c; and results 6.4' via a modeling device in accordance with FIG. 3, Depiction d.

Figure 5:
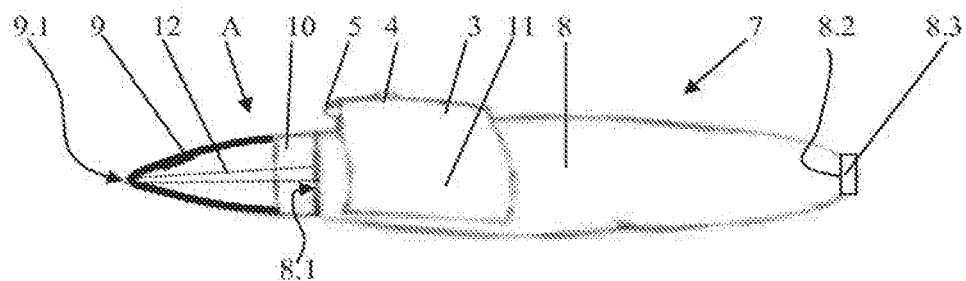
FIG. 5 shows a three-dimensional portrayal of an applicator 7 with a clipped-on LED housing 3, according to an exemplary embodiment.

FIG. 5 shows an applicator 7 according to an exemplary embodiment in a spatial representation. A reservoir 8 has a light-curing material/composite material (not shown here). A dispensing unit A that is comprised of a closure unit 9 with an outlet opening 9.1 and a holding unit 10 is connected to the reservoir 8. The closure unit 9 can have shielding on the circumference to protect the light-curing material after it leaves the outlet opening 9.1 from undesired curing because of the light effect of the LED lamp 5 and to consequently prevent clogging of the metering channel 12 in the dispensing unit A during the curing of the light-curing material/composite material that is applied when the radiation of the LED lamp 5 can penetrate the material of the closure unit 9, at least in the area of the outlet opening 9.1. If the dispensing unit A is made of a material that is not penetrated by the light of the LED, the shielding can be eliminated, as is the case here.

The LED lamp 5 is arranged in an LED housing 3 and preferably connected in a removable way with the reservoir 8 via a snap-in device 11. The LED lamp 5 provides illumination when actuated at an angle in the direction of the outlet opening 9.1 that is tilted towards the longitudinal axis, which is not shown, of the applicator 7. A switch 4 that is integrated into the LED housing 3 serves to turn the LED lamp on and off. The required electronics and a battery (not shown) are also accommodated in the LED housing 3.

The holding unit 10 and the closure unit 9 can be made of plastic or a metallic material.

The other components, such as the reservoir 8, are also made of a material that cannot be penetrated by the light of the LED to prevent undesired curing of the material.

The reservoir 8 in this example is made of a first material, or has a first material of that type, for instance a soft polyethylene (e.g. LDPE—low density polyethylene). The holding unit 10 is preferably comprised of a second material, e.g. a harder polymer, but is in any case made of a material that is harder relative to the first material of the reservoir or has a material of that type.

When pressure is applied to the reservoir 8, preferably at the circumference, for instance via manual pressure with the fingers from the outside on the reservoir 8, whose shape can change, the light-curing material is transferred or pressed through a first opening 8.1 of the reservoir 8 into the dispensing unit A. The light-curing material goes through the holding unit 10 into the closure unit 9 and is transported via it through a metering channel 12, schematically indicated with dashed lines, through the outlet opening 9.1. The LED lamp 5 can be actuated with the switch 4 during this process, so that the dispensed, light-curing material can be immediately cured. A rotation of the applicator to cure the dispensed, light-curing glue/material can therefore be omitted.

Because only one processing path is required for the application and simultaneous curing, 50% of the processing time is saved compared to solutions in which the material is first applied over the processing path and the same path is followed once again after that for curing via an LED.

After being dispensed, the light-curing composite material is cured by light, via LED light in this example in the optical wavelength range between 395 and 470 nanometers (nm). This LED light is provided by the LED lamp 5 integrated into the snap-in device, which can be put in a removable or non-removable way on the reservoir 1.

It is possible to fill up the reservoir 8 via its first opening 8.1 when the dispensing unit A is removably attachable to the reservoir.

Alternatively, a second opening 8.2 can also exist in the reservoir 8, for instance at the end opposite the outlet opening 9.1, as shown in FIG. 5. The second opening 8.2 is provided with a closure element 8.3, which can be removed for refilling.

Figure 6:
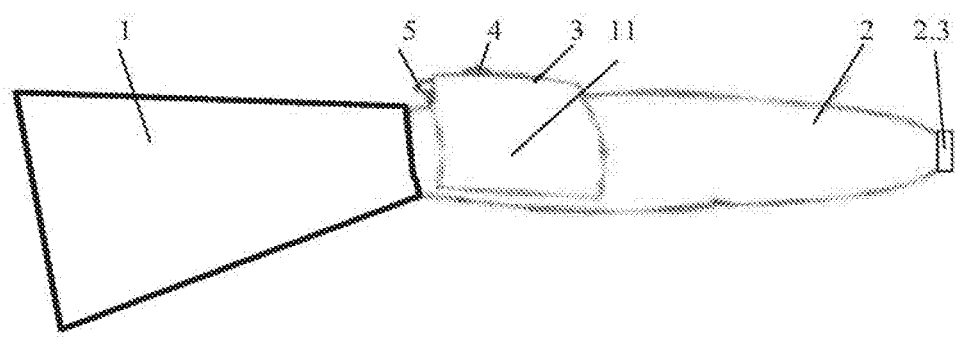
FIG. 6 shows a three-dimensional portrayal of a modeling device with a grip element and a clipped-on LED housing, according to an exemplary embodiment.

A variant is shown in FIG. 6 in which the essentially identical snap-in device 11, as it is combined with the applicator 7 in FIG. 5, is clipped with the LED housing 3 and LED lamp 5 onto the grip area 2, which is connected to a modeling device 1.

The LED housing 3 can be exchanged between the applicator 7 and the grip element 2 because of that. The material can then first be applied to a surface, for instance with the applicator 7 (which does not have an LED or its LED is not switched on) and the material can subsequently be shaped and cured with the modeling device 1 that is combined with the LED 5 and the grip element 2.

If the grip element 2 serves to hold material that can be refilled in the reservoir 8, it has a closure element 2.3.

It is advantageous when the reservoir 8 and the grip element 2 have an essentially identical design.

Figure 7:
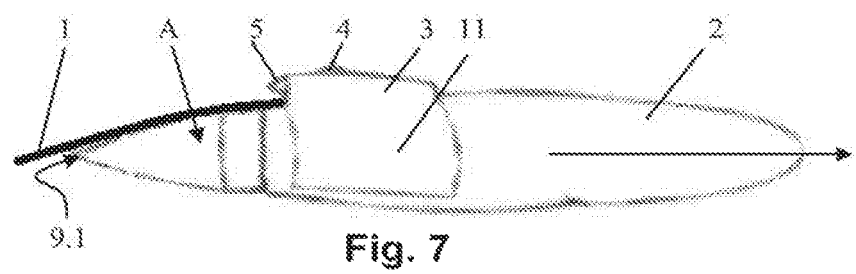
FIG. 7 shows a side view of an applicator 7 with a clipped-on LED housing 3 and a modeling device between the LED and the outlet opening, according to an exemplary embodiment.

A further variant of the application of the modeling device 1 is shown in FIG. 7. In this case, the modeling device 1 is arranged on an applicator 7 with an LED housing 3 clipped on via a snap-in device 11 and between the LED 5 and the outlet opening 9.1 or, as the case may be, the area in which the light of the LED 5 strikes an add-on and the outlet opening 9.1.

Figure 8:
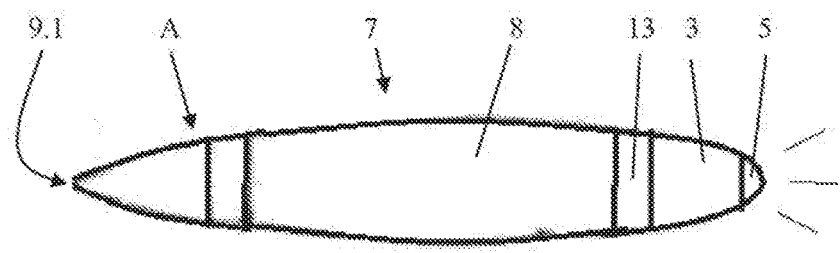
FIG. 8 shows a side view of an applicator to which the LED housing is attached via a ring-shaped adapter element on the end opposite the outlet opening, according to an exemplary embodiment.

FIG. 8 shows the side view of an applicator 7 according to an exemplary embodiment. The LED housing 3 with the LED 5 (as well as electronics, switch and battery) arranged in it are connected to the reservoir 8 of the applicator via a ring-shaped adapter element 13 that is shown in a longitudinal section at the end which is opposite the outlet opening 9.1 of the dispensing unit A.

Figure 9:
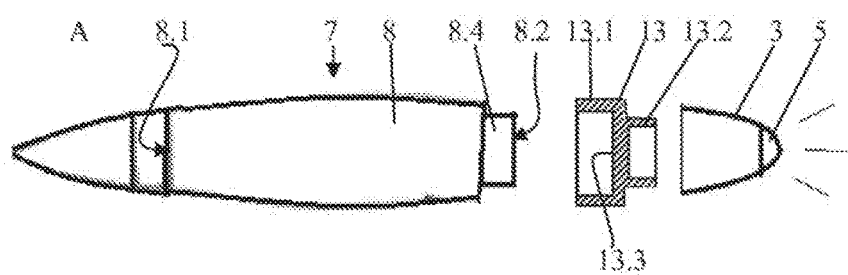
FIG. 9 shows a side view of an applicator in which the adapter element and the LED housing are shown separately.

FIG. 9 illustrates that the adapter element 13 and the LED housing 3 can be advantageously removed from the reservoir 8 of the applicator 7. The reservoir 8 has a reduced-diameter area 8.4 for this to hold the adapter element 13, which has a first ring-shaped element 13.1 for attachment to the reduced-diameter area 8.4. The adapter element 13 has, in the direction of the LED housing 3, a reduced-diameter area 13.2 that serves to hold the LED housing, which grips over the reduced-diameter area 13.2. Adapter element 13 and reservoir 8 or, as the case may be, LED housing 3 and adapter element 13 can optionally be joinable with one another, preferably in a removable fashion, via a plug-in connection, a clip connection, a screw connection etc.; the form elements required for that will then be provided, of course.

In a preferred variant, the adapter element 13 is provided in the area of the ring-shaped element 13.1 with an internal thread and the reduced-diameter area 8.4 is provided with an external thread corresponding to that, so the adapter element 13.1 can be screwed onto the reduced-diameter area of the reservoir.

The reduced-diameter area 13.2 of the adapter element 13 advantageously has an external thread, and the LED housing 3 has an internal thread corresponding to that and is consequently capable of being screwed onto the adapter element 13. An unspecified shoulder of the adapter element constitutes a limit stop for the LED housing.

Furthermore, the adapter element has a wall or base 13.3 running cross-wise. If the reservoir 8 has a second opening 8.2 to fill/refill light-curing material, in addition to the first opening 8.1 associated with the dispensing unit A, on the end that is opposite the dispensing unit A, the adapter element 13 serves to close up the second opening 8.2 via the screw connection and the wall 13.3. Moreover, the wall 13.3 can serve as a unit for switch contact to actuate the LED 5. If the LED housing 3 is somewhat at a distance to the shoulder/ limit stop through the screw connection, the switch contact is open and the LED 5 is switched off.

If the LED housing 3 as shown in FIG. 8 is screwed down to the limit stop of the adapter element, the switch contact is closed and the LED 5 lights up. The circuit can also be designed in such a way, of course, that the LED is off when the LED housing 3 is at the limit stop and it is switched on when the LED housing is moved away from the adapter element.

If a first opening 8.1 and a second opening 8.2 are provided, the reservoir can be designed to be symmetric and can also be supplied in the direction of the dispensing unit A with a diameter reduction with a thread, not shown here, onto which the dispensing unit A can be screwed; this diameter reduction is then essentially designed like the diameter reduction 8.4. In this case, attention does not have to be paid to an installation direction for the fastening of the dispensing unit and the adapter element and the production and assembly costs are less because of the symmetrical design and the same end areas of the reservoir. The reservoir can be connected to the dispensing unit at either end and to the adapter element or the LED housing at the other respective end.

Figure 10:
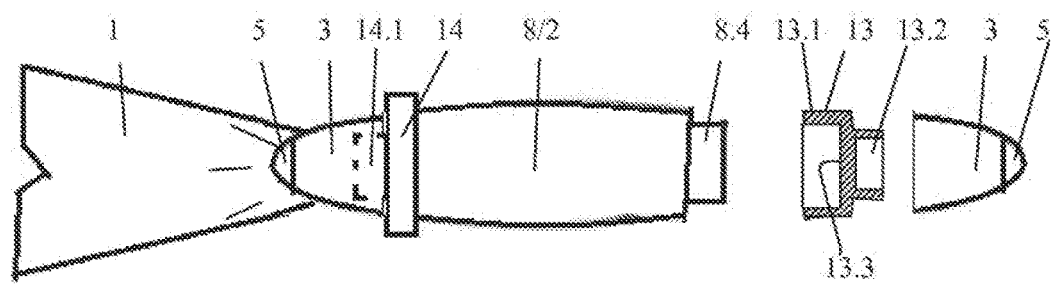
FIG. 10 shows a top view of a modeling device with a grip element to which an LED housing can be fastened via an adapter element, according to an exemplary embodiment.

If the dispensing unit is removable, a modeling device 1 can also be connected to the reservoir 8 from the direction of the first opening 8.1 of the reservoir 8 (see FIG. 10); the reservoir 8 then practically serves as a grip element 2. An LED 5, which can also be used as a "replacement LED", for instance, can then be fastened in the LED housing 3 via an adapter element 13 at the end opposite the grip element 2. An LED 5 in the LED housing 3 for curing the modeled material is attached to the reservoir 8 in the direction of the modeling device 1, for instance via a ring 14 with a holder 14.1 that is essentially identical to 13.2 and also a limit stop, so the LED housing 3 can therefore be connected to it. The modeling device 1 or a closure element (not shown) close up the first opening of the reservoir 8, which is not shown here, in this case.

Figure 11:
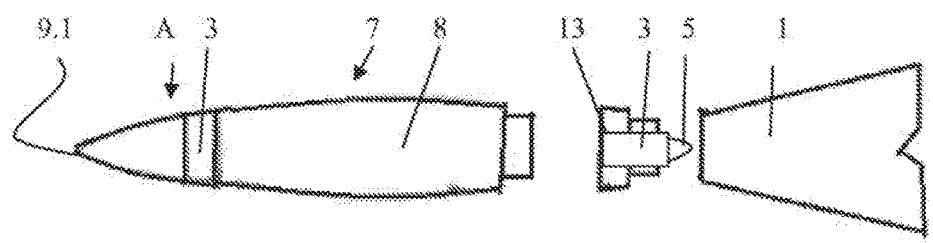
FIG. 11 shows a top view of an applicator to which a modeling element can be fastened opposite the outlet opening via an adapter element.
Figure 12:
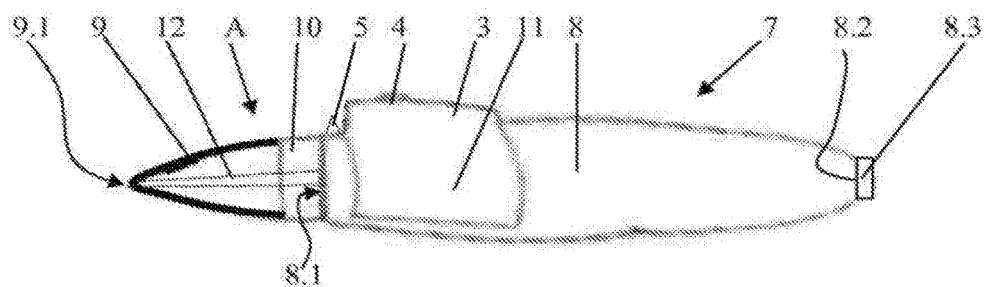
FIG. 12 shows the light source attached to the reservoir of the applicator.
Figure 13:
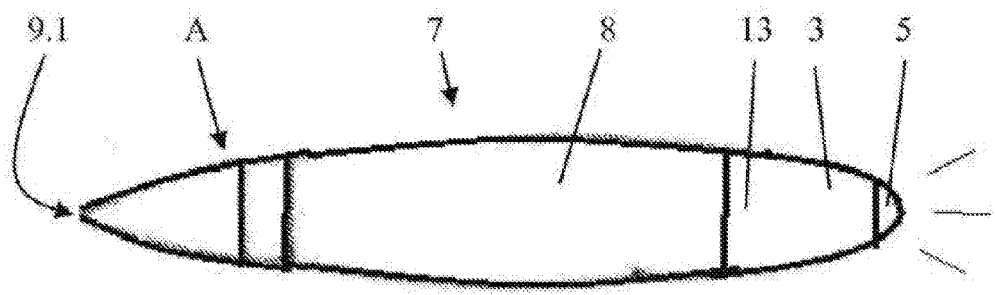
FIG. 13 shows the adapter element as a part of the LED housing.

FIG. 11 shows a top view of an applicator 7; a modeling device 1 can be attached opposite the outlet opening 9.1 to its reservoir 8 via an adapter element 13. The LED housing 3 is arranged on the adapter element with the LED pointing in the direction of the modeling device 1.

It is advantageous when the modeling device 1 is exchangeable so that different contours or shapes can be created in the dispensed material.

LIST OF REFERENCE NUMERALS

1 Modeling device
1.1 Smooth surface
1.2 Back side
1.3 Front side
2 Grip element
2.1 Holder
2.2 Hollow area
2.3 Closure/closure element
3 LED housing
4 On-off switch
5 LED
6.1 Recess, semi-circular
6.2 Recess, triangular
6.3 Recess as a waveform
6.4 Recesses in rail form
6.1' Bead with a semi-circular cross-section
6.2' Bead with a triangular cross-section
6.3' Waveform
6.4' Rails
7 Applicator
8 Reservoir
8.1 First opening
8.2 Second opening
8.3 Closure element
8.4 Reduced-diameter area
9 Closure unit
9.1 Outlet opening
10 Holding unit
11 Snap-in device
12 Metering channel
13 Adapter element
14 Ring
14.1 Holder
A Dispensing unit
M Material

The invention claimed is:

1. A set for processing a light-curing material, the set comprising:
    an applicator configured to provide for a hand-controlled dosing of the light-curing material, the applicator comprising,
        a reservoir comprising a first opening, the reservoir being configured to contain the light-curing material therein, and
        a dispensing unit comprising an outlet opening, the dispensing unit being connected to the reservoir of the applicator so that the light-curing material can be dispensed, via the first opening, into the dispensing unit;
    an LED lamp for curing the light-curing material; and
    an LED housing which is attached to the reservoir of the applicator so as to be removable, the LED housing being configured to house the LED lamp,
    wherein,
    the light-curing material is dispensed through the first opening of the reservoir via an application of a pressure on the reservoir, and either
    the LED lamp is configured to provide an illumination in a direction of the outlet opening of the dispensing unit, or
    the LED housing is attached to the reservoir of the applicator at an end which is opposite to the outlet opening of the dispensing unit so that the LED lamp is configured to provide the illumination in a direction which is opposite to the outlet opening of the dispensing unit.

2. The set as recited in claim 1, wherein,
    the applicator is provided as a pen-type applicator,
    the reservoir is formed in the pen-type applicator, and
    the reservoir is configured so that a shape of the reservoir can be changed.

3. The set as recited in claim 1, further comprising:
    at least one adapter element,
    wherein,
    the LED housing is connected to the reservoir of the applicator via the at least one adapter element.

4. The set as recited in claim 3, wherein the reservoir further comprises at least one refilling opening, the at least one refilling opening being configured so that the reservoir can be refilled with the light-curing material therethrough.

5. The set as recited in claim 4, further comprising:
    a closure element,
    wherein,
    the at least one refilling opening and the first opening are arranged on opposite ends of the reservoir, and the at least one refilling opening is further configured to be closed via the closure element.

6. The set as recited in claim 5, wherein the closure element is formed by the at least one adapter element.

7. The set as recited in claim 4, wherein the first opening of the reservoir is the at least one refilling opening.

8. The set as recited in claim 3, wherein the LED housing is screwed onto the reservoir of the applicator directly or via the at least one adapter element.

9. The set as recited in claim 3, wherein the at least one adapter element is provided as a clip element or as a plug-in element.

10. The set as recited in claim 3, wherein,
the at least one adapter element is provided as a ring-shaped adapter element, and
the LED housing is arranged on or formed on the ring-shaped adapter element.

11. The set as recited in claim 3, wherein the at least one adapter element is provided as a part of the LED housing.

12. The set as recited in claim 1, wherein the LED housing comprising the LED lamp is provided as one piece and is at least one of,
arranged along a circumference of the reservoir of the applicator, and
molded to the reservoir along the circumference of the reservoir of the applicator.

* * * * *